US005566740A

United States Patent [19]
Mullet et al.

[11] Patent Number: 5,566,740
[45] Date of Patent: Oct. 22, 1996

[54] SECTIONAL OVERHEAD DOOR

[75] Inventors: Willis J. Mullet, Pensacola Beach; Albert W. Mitchell, Pace, both of Fla.

[73] Assignee: Wayne-Dalton Corp., Mt. Hope, Ohio

[21] Appl. No.: 423,894

[22] Filed: Apr. 18, 1995

Related U.S. Application Data

[62] Division of Ser. No. 260,108, Jun. 15, 1994, Pat. No. 5,522,446.

[51] Int. Cl.$^6$ .................................................. E05D 15/10
[52] U.S. Cl. ............................................ 160/229.1; 16/355
[58] Field of Search ......................... 160/201, 229.1, 160/235, 232, 207; 16/355, 389, 390, 391, 392

[56] References Cited

U.S. PATENT DOCUMENTS

| 693,546 | 2/1902 | Johnson | 16/392 |
|---|---|---|---|
| 1,248,407 | 11/1917 | Ryan | 16/355 |
| 1,429,527 | 9/1922 | Paul | 16/389 |
| 1,530,762 | 3/1925 | Dautrick . | |
| 1,621,669 | 3/1927 | Johnson . | |
| 1,626,844 | 5/1927 | Kuhn . | |
| 1,724,995 | 8/1929 | Dautrick . | |
| 1,750,042 | 3/1930 | Hoover . | |
| 1,827,433 | 10/1931 | Kendall . | |

(List continued on next page.)

FOREIGN PATENT DOCUMENTS

| 0438046B1 | 10/1993 | European Pat. Off. | E06B 3/96 |
|---|---|---|---|
| 0370324B1 | 3/1994 | European Pat. Off. | E06B 3/48 |
| 0370376B1 | 7/1994 | European Pat. Off. | E06B 3/48 |
| 0612910A2 | 8/1994 | European Pat. Off. | E06B 5/16 |
| 1270986 | 7/1964 | Germany . | |
| 3814275C2 | 2/1993 | Germany | E05D 13/00 |
| 3922981C2 | 2/1993 | Germany | E06B 9/06 |
| 9206018 U | 7/1993 | Germany | E06B 9/06 |
| 3922995C2 | 9/1993 | Germany | E05D 3/02 |
| 9308874 U | 9/1993 | Germany | E06B 7/28 |
| 9308440 U | 9/1993 | Germany | E06B 7/28 |
| 4227311A1 | 2/1994 | Germany | E06B 3/48 |
| 9406615 U | 9/1994 | Germany | F16S 3/02 |
| WO93/09325 | 5/1993 | WIPO | E06B 3/88 |

*Primary Examiner*—David M. Purol
*Attorney, Agent, or Firm*—Renner, Kenner, Greive, Bobak, Taylor & Weber

[57] ABSTRACT

A sectional door (20) having a plurality of panels (21, 22, 23, 24) including, a body portion (25) of the panels spacing and joining longitudinal edges (40, 50), one of the edges (40) between adjacent panels on a first panel having a substantially concave curvilinear surface (45) in vertical cross-section, the other of the edges (50) between adjacent panels on a second panel having a substantially planar surface (52) in vertical cross-section, longitudinally-spaced hinges (65) interconnecting the first and second panels for pivotal movement. The hinges include a first hinge element (66) having a first leaf (67) overlying and attached to one of the adjacent panels, a generally cylindrical first knuckle (72) at one edge of the first leaf, a through slot (73) in the first leaf proximate the first knuckle, a second hinge element (80) having a second leaf (85) overlying and attached to an adjacent panel, and a generally cylindrical second knuckle (81) at one edge of the second hinge element extending into the through slot and rotatable about the first knuckle. A panel (22) for sectional door (20) having a generally rectangular foam core (140, 240, 340), an inner surface (145, 245, 345) extending the longitudinal length of said foam core, and a recess (150, 250, 350) in the inner surface and the foam core extending the longitudinal length of the foam core. A bracket assembly (110) for the bottom (35) of the lower panel (24) of the door including, an L-shaped plate (111) overlying a portion of the inner surface (36) of the lower panel, a generally cylindrical sleeve (120) affixed on the plate for receiving a shaft (121) mounting one of the rollers (122), fasteners (115) for attaching the L-shaped plate to the lower panel positioned to underlie a portion of the cylindrical sleeve and the shaft, and cut-outs (125) in the cylindrical sleeve positioned substantially above the fasteners whereby the fasteners may be removed only when the shaft is not positioned in the cylindrical sleeve.

10 Claims, 8 Drawing Sheets

U.S. PATENT DOCUMENTS

| | | | |
|---|---|---|---|
| 1,888,162 | 11/1932 | Eklund. | |
| 1,955,644 | 4/1934 | Lowe et al. | 16/178 |
| 1,990,870 | 2/1935 | Kelly | 20/20 |
| 1,994,142 | 3/1935 | Madsen | 20/19 |
| 2,017,012 | 10/1935 | Morgan | 20/20 |
| 2,059,833 | 11/1936 | Winn, Jr. | 20/20 |
| 2,093,019 | 9/1937 | Norberg | 20/20 |
| 2,099,191 | 11/1937 | Blodgett | 20/20 |
| 2,166,746 | 7/1939 | Bartel | 20/20 |
| 2,196,903 | 4/1940 | Rowe et al. | 160/201 |
| 2,484,609 | 10/1949 | Clark | 16/355 X |
| 2,557,716 | 6/1951 | Allee | 16/137 |
| 2,641,792 | 6/1953 | Peeler | 16/86 |
| 2,681,480 | 6/1954 | Dixon, Sr. | 20/16 |
| 2,694,234 | 11/1954 | Roby et al. | 20/16 |
| 2,817,875 | 12/1957 | Harris et al. | 18/4 |
| 2,852,840 | 9/1958 | Harvey | 29/472.9 |
| 2,910,741 | 11/1959 | Dettman | 26/16 |
| 2,932,056 | 4/1960 | Crosswell | 16/171 |
| 2,952,313 | 9/1960 | Stroup | 160/209 |
| 3,102,583 | 9/1963 | Rowe et al. | 160/209 |
| 3,103,410 | 9/1963 | Dobbins | 18/56 |
| 3,160,200 | 12/1964 | McKee et al. | 160/189 |
| 3,165,143 | 1/1965 | Jackwig | 160/189 |
| 3,302,690 | 2/1967 | Hurd | 160/40 |
| 3,319,697 | 5/1967 | Krohn | 160/229 |
| 3,322,586 | 5/1967 | Hasenwinkle et al. | 156/201 |
| 3,359,594 | 12/1967 | Pastoor | 16/178 |
| 3,376,913 | 4/1968 | Clapsaddle | 160/201 |
| 3,566,448 | 3/1971 | Ernst | 18/4 |
| 3,635,277 | 1/1972 | Bahnsen | 160/191 |
| 3,648,755 | 3/1972 | Thiele | 160/201 |
| 3,693,693 | 9/1972 | Court | 160/201 X |
| 3,869,269 | 3/1975 | Knapp | 65/106 |
| 3,893,269 | 7/1975 | Nelsson et al. | 52/65 |
| 3,934,635 | 1/1976 | Kin | 160/189 |
| 3,941,180 | 3/1976 | Thill | 160/229 |
| 4,040,142 | 8/1977 | Ippolito | 16/137 |
| 4,151,031 | 4/1979 | Goad et al. | 156/201 |
| 4,238,544 | 12/1980 | Mullet | 428/71 |
| 4,269,253 | 5/1981 | Ziegler | 160/40 |
| 4,284,118 | 8/1981 | Ceron | 160/229 |
| 4,339,487 | 7/1982 | Mullet | 428/71 |
| 4,348,164 | 9/1982 | Fujii et al. | 425/89 |
| 4,387,760 | 6/1983 | Greschbach | 160/229 |
| 4,472,910 | 9/1984 | Iha | 49/139 |
| 4,667,724 | 5/1987 | Dragone | 160/229 |
| 4,685,266 | 8/1987 | Mullet | 52/309.11 |
| 4,850,082 | 7/1989 | Yi | 16/355 X |
| 4,878,267 | 11/1989 | Roach et al. | 16/250 |
| 4,893,666 | 1/1990 | Hörmann | 160/229.1 |
| 4,989,660 | 2/1991 | Wagner | 160/201 |
| 5,001,862 | 3/1991 | Albenda | 49/383 |
| 5,002,114 | 3/1991 | Hörmann | 160/229.1 |
| 5,036,899 | 8/1991 | Mullet | 160/189 |
| 5,043,128 | 8/1991 | Umeda | 264/258 |
| 5,103,890 | 4/1992 | Cloutier | 160/190 |
| 5,170,832 | 12/1992 | Wagner | 160/201 |
| 5,235,724 | 8/1993 | Perrin et al. | 160/201 X |

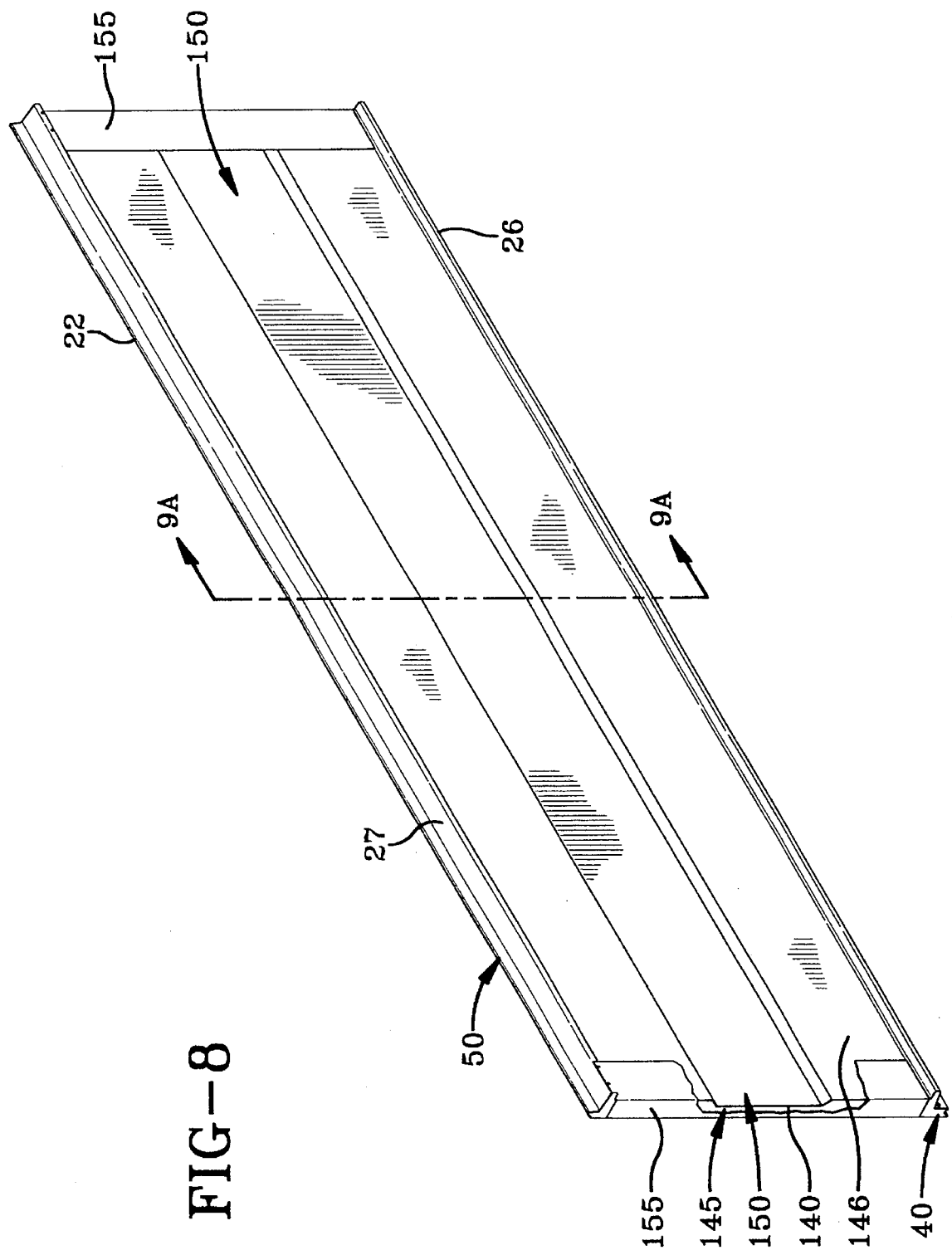

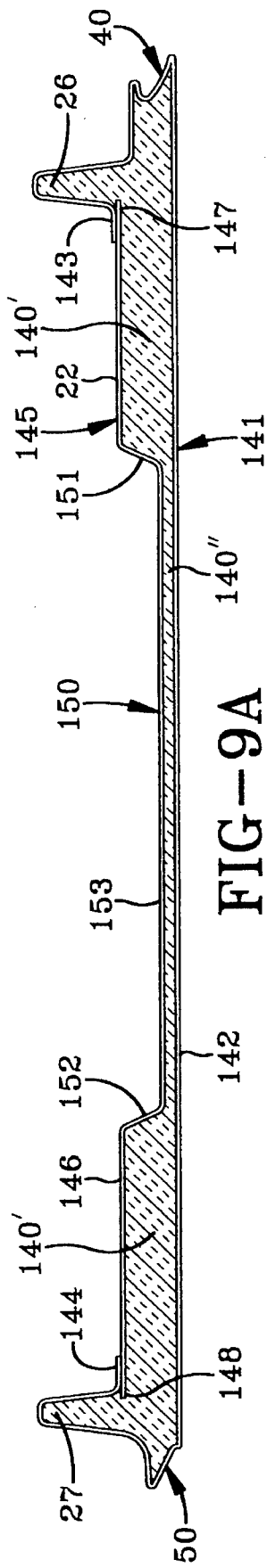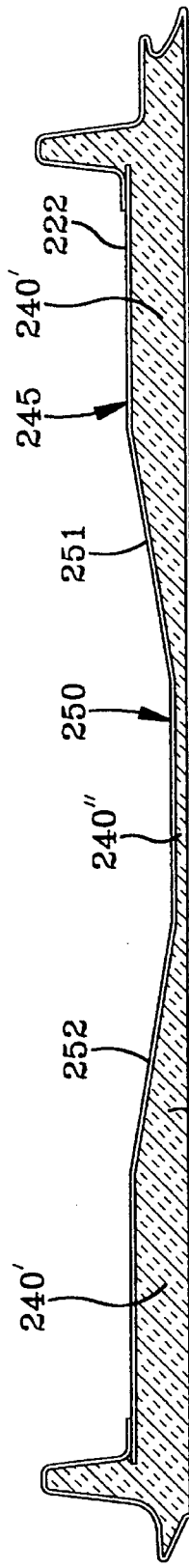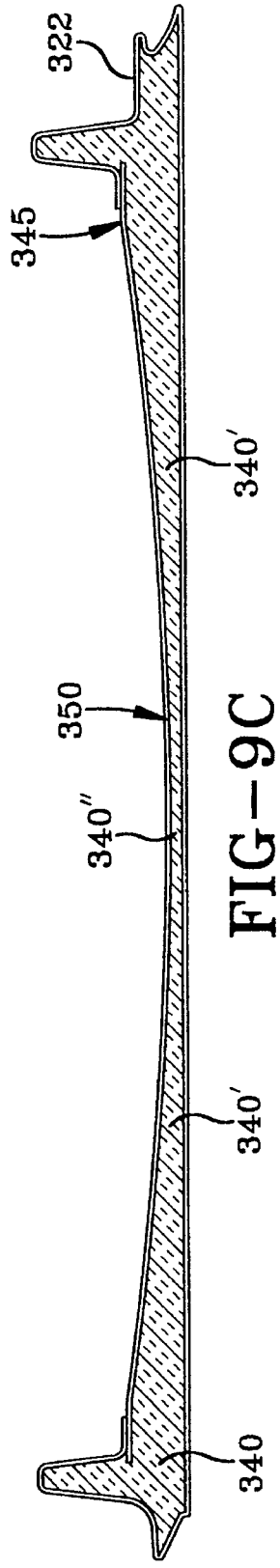

SECTIONAL OVERHEAD DOOR

This application is a division of U.S. application Ser. No. 08/260,108, filed Jun. 15, 1994 now U.S. Pat. No. 5,522,446.

TECHNICAL FIELD

The present invention relates generally to a panel and hardware components for sectional overhead doors. More particularly, the present invention relates to a panel and hinge arrangement and a bracket for sectional overhead doors which move between a closed position proximate to a vertical door opening to an open position in substantially horizontal orientation with the door panels articulating through a curved portion of the track system in traversing from the closed to the open position and vice versa. More specifically, the present invention relates to an arrangement for such multi-panel overhead doors having an advantageous door panel configuration, a hinge arrangement providing an anti-pinch feature between adjacent panels during their relative angular articulation, and a bottom bracket with a safety feature.

BACKGROUND ART

Sectional overhead doors have been commonly employed for many years as garage doors in homes, commercial and utility building doors, and in similar applications. The panels of conventional sectional doors are commonly joined by hinges positioned on the inner or internal side of the door which form pivot points proximate the juncture between each of the adjacent panels to permit the panels to pivot relative to each other. The hinges at the lateral edges of the panels or separate mounting brackets carry shaft-mounted rollers which inter-engage with track sections that control the path of travel of the doors. These track systems commonly include a generally vertical section positioned proximate a door frame or other opening and a generally horizontal section that extends substantially perpendicular to the vertical section rearwardly into the interior of the building in an overhead position. A curved transition section is normally positioned proximate the header at the top of the door frame and interconnects the vertical section and the horizontal section to provide a continuous track system. The hinges permit the door panels to articulate as the rollers interconnecting the door and the track system traverse from the vertical section through the transition section to the horizontal section of the track and vice versa.

Hinges employed for such sectional overhead doors have remained of generally consistent design over many years. Most commonly the hinges have been stamped from relatively lightweight steel, with the formation of gussets and sidewalls to obtain the requisite strength. The two hinged leaves with the formed contours are normally attached at their knuckle areas by a pivot pin. The pivot pins are commonly a rolled pin formed of the same or a comparable light-gauge steel and flared at the end during assembly for retaining the pin in the knuckles. The hinge leaves may be provided with an additional roll pin supported in a flange and mounting guide rollers which engage the track sections. Hinges of this type tend to be relatively crude and are noted for binding and poor operation, at least after some operating period if not shortly after installation. Particularly troublesome in this respect is the lack of uniformity of the flaring of the rolled pivot pins, which is notoriously imprecise. Further, with the rolled pin configuration, the extreme lateral edges of the hinge material end up serving as the bearing surface between the hinges and the rolled pivot pin.

In some instances, sectional doors for certain applications have been made which employ interfitting cylindrical members at the edges of adjacent panels. Normally, these cylindrical members have constituted an extension of a wall or covering for the panels, which extend the entire lateral width of the panels. Each of the panel extensions are formed into a segment of a cylinder at a pivot joint, with one being radially slightly smaller than the other to interfit therein. Frequently, a tubular bearing member is inserted within the interfitting cylindrical members to serve as a hinge pin and to receive the shaft for a roller extending outwardly for engagement with a track positioned proximate to the door. Such interfitting cylindrical members, however, in extending the full length of the door, require a considerable amount of additional material at substantial cost. Additionally, hinges extending the full transverse width of a door panel, particularly in sizeable doors, are prone to binding and chafing over large surface areas of the cylindrical hinge members due to the inevitable bending or deflection which necessarily takes place over the substantial lateral extent or width of the cylindrical hinge members.

A recently significant consideration which is involved in the configuration and operation of the hinges and the interconnected panels is that of providing an anti-pinch characteristic. This refers to the provision of some type of structure to cover or minimize the gap formed between the panels, particularly at their position of maximum angularity when traversing the curved transition section of the interrelated track, such as to prevent the insertion of a person's hands or fingers whereby they could be pinched as the door moves between the track sections. In this respect, it has been empirically determined that a gap between the edges of adjacent panels during articulation of the door panels not exceeding approximately 0.2 in. or 5 mm. satisfies these requirements.

To date, various approaches have been taken to incorporate anti-pinch features to some extent into sectional overhead doors. One approach for providing an anti-pinch joint between adjacent panels of a sectional overhead door is to create an external barrier which is designed to preclude the entrance of a person's finger or other object into the hinge area. Anti-pinch devices of this type may be made of rigid or somewhat flexible materials and are characteristically attached to the outside of the door panels in proximity to the hinge area. For the most part, these barriers are formed or in some manner biased, as by a spring or otherwise, to maintain the barrier material in contact with the exterior surface of adjacent door panels throughout the pivotal action of the panels when traversing between the vertical and horizontal track sections. Such external barriers often require a substantial amount of material, as well as precise positioning and operation, to insure that the external barrier is maintained during the entirety of the angular movement which takes place between the panels. Flexible external barrier devices may be subject to damage or deterioration caused by weather conditions due to their outward, fully exposed positioning. As a result of these drawbacks, efforts have been made to provide anti-pinch devices which take a form other than an external barrier.

More recently, efforts have been made to construct what might be termed an internal barrier to accomplish an anti-pinch function. Doors of this type endeavor to provide contours on the mating edges of adjacent panels, such that an overlapping surface or a gap too narrow for the insertion of a person's finger is presented at all times during the angular rotation between adjacent panels from the smallest to the largest angular orientations for a particular sectional overhead door system.

Numerous problems, however, have been encountered in the application of an internal barrier configuration to overhead door panels. In some instances, intricate configurations are employed which may tend to cause very stringent fabrication requirements or unduly precise installation procedures. Any deficiencies in these respects normally result in door panels which minimally interfere or bind to a sufficient extent to cause highly undesirable drag in the movement of the door. In some instances, the contoured panel edges may be configured, such that it is difficult or impossible to effect the attachment of hinges at a sufficiently reinforced surface or at locations where the pivot axis of the hinges is optimally located. In other instances, the edge configurations make sealing against water and air filtration extremely difficult, if not impossible. Another problem with the use of contoured edges is that in many instances it is difficult to achieve a rapid separation of the interfitting surfaces as soon as an angularity between the panel commences to preclude the introduction of undesirable drag forces. To Applicants' knowledge, no internal barrier configuration has fully satisfied all these various competing requirements.

Sectional overhead doors also normally employ brackets rather than hinges to mount rollers proximate the upper edge of the top panel and proximate the lower edge of the bottom panel. The bottom bracket located proximate the lower edge of the bottom panel also serves the purpose of providing a connector for attachment of the counterbalancing system to the door. In particular, the bracket has an anchor for attachment of the end of the cable which interrelates with the tensioning elements, commonly springs, of the counterbalance system for the door. The brackets also normally have an attached cylindrical sleeve for receiving a shaft mounting a roller that is affixed to a mounting plate of the bracket, which is normally attached to the door by fasteners. The fasteners are normally located spaced from the cylindrical sleeve to permit easy access by tools for operating the fasteners.

This common arrangement can produce a significant safety hazard when installation and repair personnel or owners of buildings having such sectional overhead doors attempt to effect adjustment or replacement of damaged bottom bracket components. The problem from a safety vantage arises when a person endeavors to loosen or remove the bottom bracket from the door with the door in the closed, vertical position. Under this condition, the counterbalance system is exerting maximum force on the bottom bracket through the connecting cable. As a result, if the fasteners on the bottom bracket are removed or nearly removed, the counterbalance system operating through the connecting cable forces the entire bottom bracket upwardly at great force and speed causing the potential for serious injury to a person in close proximity endeavoring to remove the bracket. In many instances, persons working on an overhead door do not perceive the impending danger associated with removal of the bottom bracket in the closed, vertical position until the above-described dangerous result has taken place.

In recent years, panels for sectional overhead doors of the type described herein constructed of foam with a skin cover have enjoyed increasing popularity. Refinements in such door panels have come largely in terms of the materials or combinations of materials employed in the skin. While light-gage steel is commonly used for the outer skin exposed to the outdoor environment, less expensive materials, such as treated or metallic-coated paper and non-metallic sheet materials, are increasingly employed as inner skin coverings for selected applications. Efforts have also been made in foam compounding to develop less expensive foams having the required strength and insulation qualities. What has remained constant is the notion that a substantially uniform thickness of foam, whether precut inserts or expanded in place, is necessary to achieve required strength and insulation characteristics of panels having a foam core.

DISCLOSURE OF THE INVENTION

Therefore, an object of the present invention is to provide a sectional overhead door having bottom edge profiles and top edge profiles which interfit on adjacent panels to provide an anti-pinch function. Another object of the invention is to provide such panels which have edge profiles that interfit during articulation of the panels as the door moves between the closed, vertical position and the open, horizontal position, such as to prevent insertion of hands or fingers of a person between the panel profiles during articulation of adjacent panels. A further object of the present invention is to provide such edge profiles that can be adjusted to eliminate the rubbing or abrading of mating profiles, which would create a drag that would require additional counterbalancing to overcome.

Another object of the present invention is to provide a sectional overhead door with panel profiles that can be configured of various types of material, including lighter gauge steels, wherein the edge profiles can operate in close proximity to each other without engaging. Yet another object of the present invention is to provide such edge profiles which interfit in a manner to prevent air and/or water infiltration between adjacent panels when the door is in the closed, vertical position. Still a further object of the present invention is to provide such edge profiles that are configured to seat a strip of foam or other weather-sealing material, which enhances the weather-sealing capability and may provide the requisite spacing between adjacent profiles during installation of a sectional door.

Another object of the present invention is to provide a sectional overhead door wherein the panels may be constructed of a variety of materials or laminates of various materials to create panels having varying desired amounts of strength. Still a further object of the present invention is to provide such panels which may have strengthening struts to effect increased rigidity to the panels and to assist in the attachment of hinges for interconnecting adjacent panels. Still another object of the present invention is to provide such panels which have the various advantageous operational features, while requiring only relatively small hinges intermittently spaced along the width of a particular sectional door. Another object of the invention is to provide such panels wherein the entire anti-pinch barrier is formed with the surface material of the panels without additional components to thereby minimize overall door weight and cost.

Another object of the present invention is to provide a sectional overhead door having hinges which are configured to accommodate the edge profiles of the panels. Still a further object of the present invention is to provide such hinges that are constructed of a minimum of pieces consisting of a pair of interlocking hinge elements which do not require a hinge pin. Still another object of the present invention is to provide such hinges with a cylindrical knuckle on one hinge element and a tongue on the other element having an internal diameter substantially equal to the external diameter of the cylindrical knuckle with raised bearing surfaces on the knuckle or tongue to minimize friction during relative rotation between the hinge elements.

Still another object of the invention is to provide such a sectional overhead door having hinges which prevent disassembly of the hinges when the hinge elements are attached to the door panels in operative position, yet permit the detachment of damaged hinge elements from a door and their ready replacement. Still a further object of the invention is to provide such hinges which may be variably configured to form roller mounts in selected positions to mount rollers positioned at different distances from the back of a door panel to achieve appropriate relief of the door from the door frame during operation. Still a further object of the invention is to provide such hinges which may have offset portions to serve as a backup plate when attaching to relatively thin door materials to thereby avoid the necessity of additional components or material to effect a hinge back-up function.

Another object of the present invention is to provide a sectional overhead door having a bottom bracket configuration which, as a safety feature, precludes removal of the bottom bracket from a door when the cable interconnecting the door with the counterbalance system is tension loaded. Still a further object of the invention is to provide such a safety bracket wherein the fasteners attaching the bracket to the door cannot be removed because the positioning of the sleeve supporting the roller shaft engaging the tracks interferes with removal of the fasteners when the counterbalance cable is tensioned, at which time the shaft and roller cannot be removed from the sleeve. Another object of the present invention is to provide such a bottom bracket which may be otherwise installed and operates in the manner of a conventional bottom bracket.

A further object of the present invention is to provide an improved overhead door panel which can be made of all conventional foams and skin materials or combinations thereof. Another object of the present invention is to provide such an improved door panel which can be adapted to different panel configurations and to various types of operating hardware to satisfy varying cost and climatic parameters. Still another object of the present invention is to provide such an improved door panel which can substantially maintain strength and insulation specifications for a foam-filled panel, while employing a substantially reduced quantity of foam per panel to thus realize significant cost savings.

In general, the present invention contemplates a sectional door having a plurality of panels articulated at the joinder between adjacent panels for moving between a closed position and an open position including, a body portion of the panels spacing and joining longitudinal edges, one of the edges between adjacent panels on a first panel having a substantially concave curvilinear surface in vertical cross-section in the closed position of the door, the other of the edges between adjacent panels on a second panel having a substantially planar surface in vertical cross-section in the closed position of the door extending angularly from substantially the outer surface of the door, longitudinally-spaced hinges interconnecting the first and second panels for pivotal movement between planar and varying angular orientations when moving between the open position and the closed position with the concave surface and the planar surface in facing relation in the closed position, the planar surface and the concave surface remaining in sufficiently close proximity during the entirety of the pivotal movement of the first and second panels so as to preclude the insertion of a person's finger therebetween while maintaining adequate clearance to avoid interference.

The present invention also contemplates a pivotal connector for a sectional door having a plurality of panels articulated at the joinder between adjacent panels including, a first hinge element having a first leaf overlying a portion of one of the adjacent panels, apertures in the first leaf for receiving fasteners to effect attachment of the first leaf to one of the adjacent panels, a generally cylindrical first knuckle at one edge of the first leaf, a through slot in the first leaf proximate to the first knuckle, a second hinge element having a second leaf overlying the other of the adjacent panels, bores in the second leaf for receiving fasteners to effect attachment of the second hinge element to the other of the adjacent panels, and a generally cylindrical second knuckle at one edge of the second hinge element extending into the through slot and rotatable about the first knuckle for controlled relative pivotal motion between the first hinge element and the second hinge element.

The present invention further contemplates a bracket assembly for the bottom of the lower panel of a sectional overhead door operable by rollers in a track system and counterbalanced by a tensioned cable including, an L-shaped plate overlying a portion of the inner surface and side edge of the lower panel, anchor means for securing the cable to the plate, a generally cylindrical sleeve affixed on the plate for receiving a shaft mounting one of the rollers, fasteners for attaching the L-shaped plate to the lower panel positioned to underlie a portion of the cylindrical sleeve and the shaft, and cut-outs in the cylindrical sleeve positioned substantially above the fasteners, whereby the fasteners may be removed only when the shaft is not positioned in the cylindrical sleeve.

The present invention additionally contemplates a panel for a sectional door employing a plurality of such panels articulated at the joinder between adjacent panels for moving between a closed position and an open position, including a generally rectangular foam core, an outer surface extending the longitudinal length of the foam core, an inner surface extending the longitudinal length of the foam core, an edge profile extending the longitudinal length of the foam core and interconnecting the outer surface and the inner surface, struts on the inner surface extending the longitudinal length of the foam core and positioned proximate to the edge profile, and a recess in the inner surface and the foam core extending the longitudinal length of the foam core.

BRIEF DESCRIPTION OF THE DRAWINGS

FIG. 8 is a perspective view of a preferred form of panel construction according to the concepts of the present invention for the sectional overhead door herein disclosed.

FIG. 9A is a cross-sectional view of the panel of FIG. 8 taken substantially along the line 9A—9A of FIG. 8.

FIG. 9B is a cross-sectional view similar to FIG. 9A showing a panel having a modified form of recess in the inner surface.

FIG. 9C is a cross-sectional view similar to FIGS. 9A and 9B showing another modified form of recess in the inner surface.

PREFERRED EMBODIMENT FOR CARRYING OUT THE INVENTION

Figure 1:
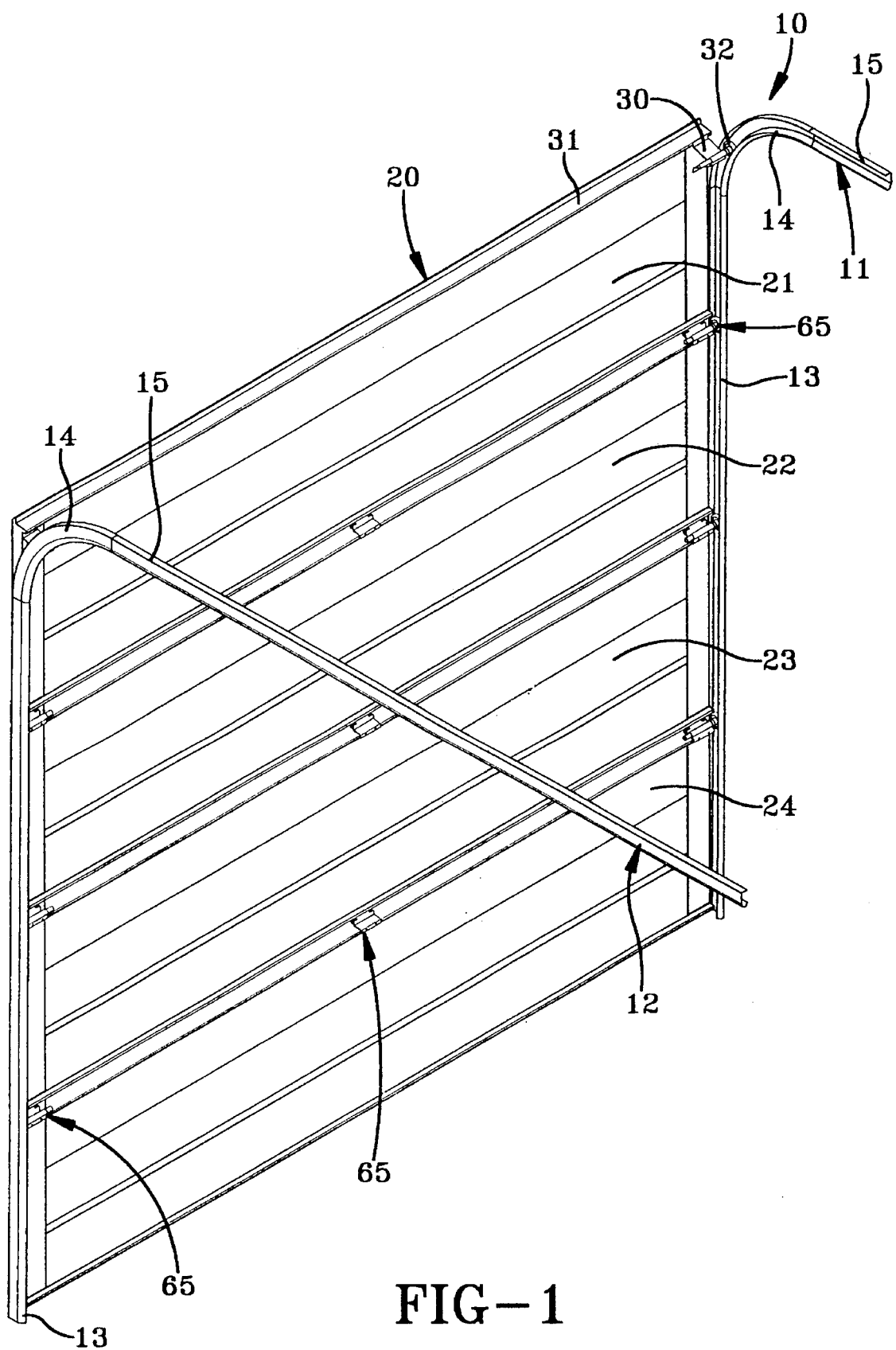
FIG. 1 is a perspective view of the interior of a sectional overhead door incorporating hinges and brackets according to the concepts of the present invention with the door shown in the vertical, closed position on the rails.

A sectional overhead door system embodying the concepts of the present invention is generally indicated by the numeral 10 in FIG. 1 of the drawings. The door system 10 includes a pair of spaced track assemblies, generally indicated by the numerals 11 and 12. As shown, the track assemblies 11 and 12 are symmetrically opposite but otherwise structurally identical. The track assemblies 11, 12 each have a vertical track section 13 of appropriate length to extend substantially the distance from the ground or floor of a garage or other structure to a position proximate the header of a door frame in which the door system 10 is to be mounted. Atop each vertical track section 13, there is a curved transition track section 14. The curved transition track sections 14 are normally connected to the vertical track sections 13 as by connector plates (not shown) and bolts or rivets (not shown) according to common practice in the industry. The curved transition track sections 14 are in turn attached in an identical manner to horizontal track sections 15, which extend preferably substantially horizontally inwardly into the building from the door frame a distance comparable to the length of vertical track sections 13.

The vertical and horizontal track sections 13, 15 are normally constructed of straight pieces of rail which are cut to length for a particular door opening and attached by brackets (not shown) or comparable elements to the door frame. It is to be appreciated that the track assemblies 11, 12 and their positioning with respect to a door frame are in accordance with standard practice in the industry. In addition, all of the track sections 13, 14, and 15 may have the generally J-shaped, cross-sectional configuration which is commonly known and used in the industry.

As shown, the sectional door, generally indicated by the numeral 20, of the door system 10 is guided, and in part supported, by the track assemblies 11, 12. For exemplary purposes, a four-panel sectional door 20 is shown in FIG. 1 of the drawings. However, it will be appreciated by persons skilled in the art that five, six, or more panels may be employed in sectional doors of this type, depending upon the height of the door opening and related considerations.

As shown, the sectional door 20 consists of a top panel 21, an upper middle panel 22, a lower middle panel 23, and a bottom panel 24. The panels 21, 22, 23, and 24 are interrelated to each other and to the track assemblies 11, 12 in a manner described hereinafter. In conventional fashion, the top panel 21 carries preferably near the top edge 31 thereof a top bracket 30 which mounts a roller 32 that is offset from the door 20 a distance to effect closure of the top panel 21 when the door 20 is in the vertical, closed position.

Figure 3:
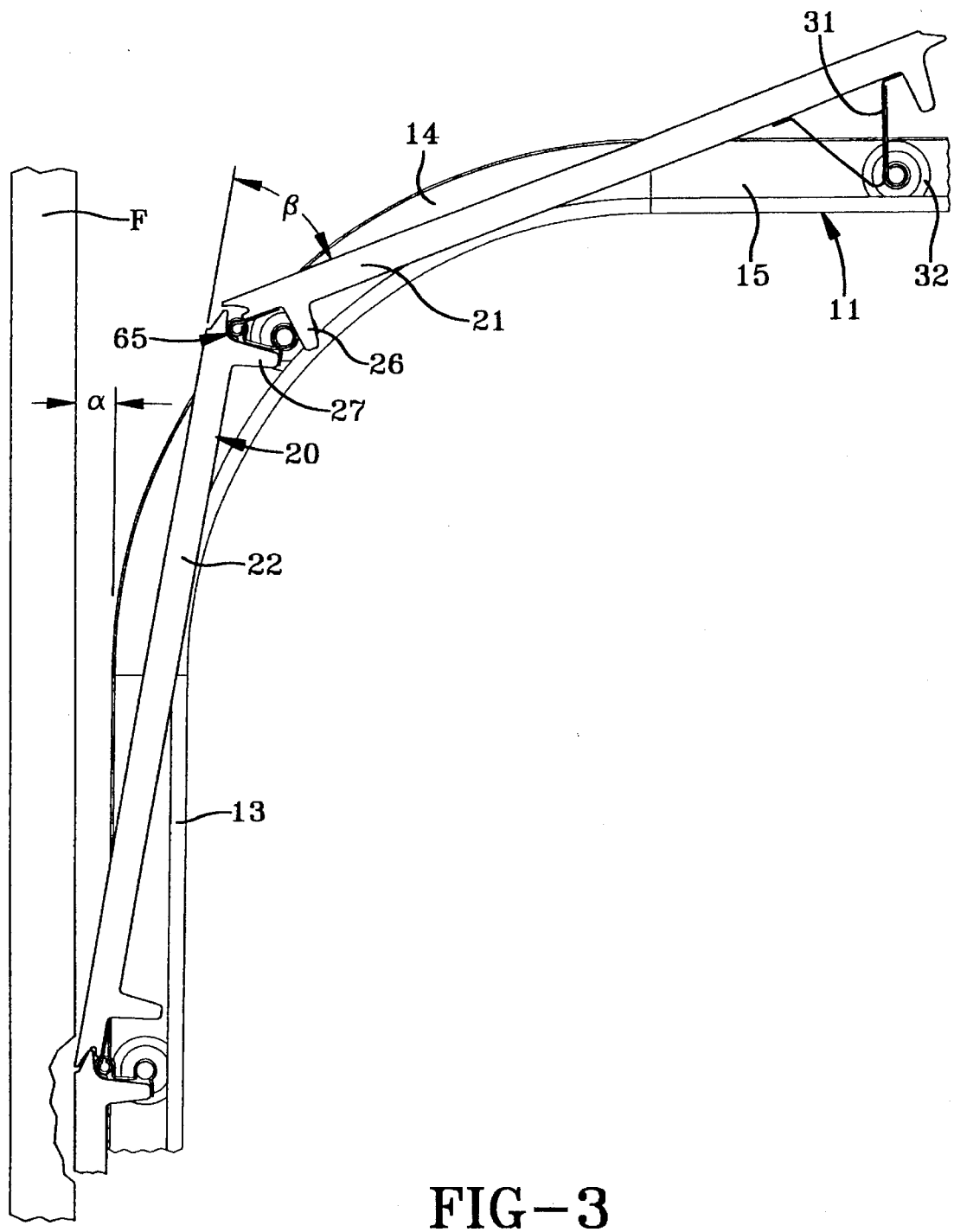
FIG. 3 is a side-elevational view of the sectional overhead door of FIG. 1 showing a fragmentary portion of the rail and door with the door panels depicted in a position of substantially maximum angular orientation with the roller adjacent the hinge positioned substantially medially of the curved transition track section between the vertical track and the upper horizontal track.

Referring now to FIG. 3 of the drawings, it is to be understood that in order to keep the sectional door 20 free from frictional resistance as it approaches and departs from the fully closed position depicted in FIG. 1 and thus permit substantially unobstructed vertical motion, the vertical track section 13 is normally located at an angle a of approximately one degree with respect to the door frame F. It will thus be appreciated that the vertical track section 13 is displaced progressively upwardly from the floor an increasing distance from the door frame F, which is designed to be a substantially plumb vertical line. Thus, the top bracket 30, in being positioned above the top of the vertical track section 13 and normally in the transition track section 14, must necessarily displace the roller 32 a substantial distance from the top panel 21.

The articulation between panels 21 and 22, 22 and 23, and 23 and 24 and the anti-pinch feature of sectional door 20 are effected by the configurations of the panels and their interconnection as hereinafter described. Inasmuch as the configuration of the various panels 21, 22, 23, and 24 may be identical and the connecting elements identical except as hereinafter noted, the structure proximate the joinder of panels 21 and 22 will be detailed hereinafter as exemplary.

Figure 2:
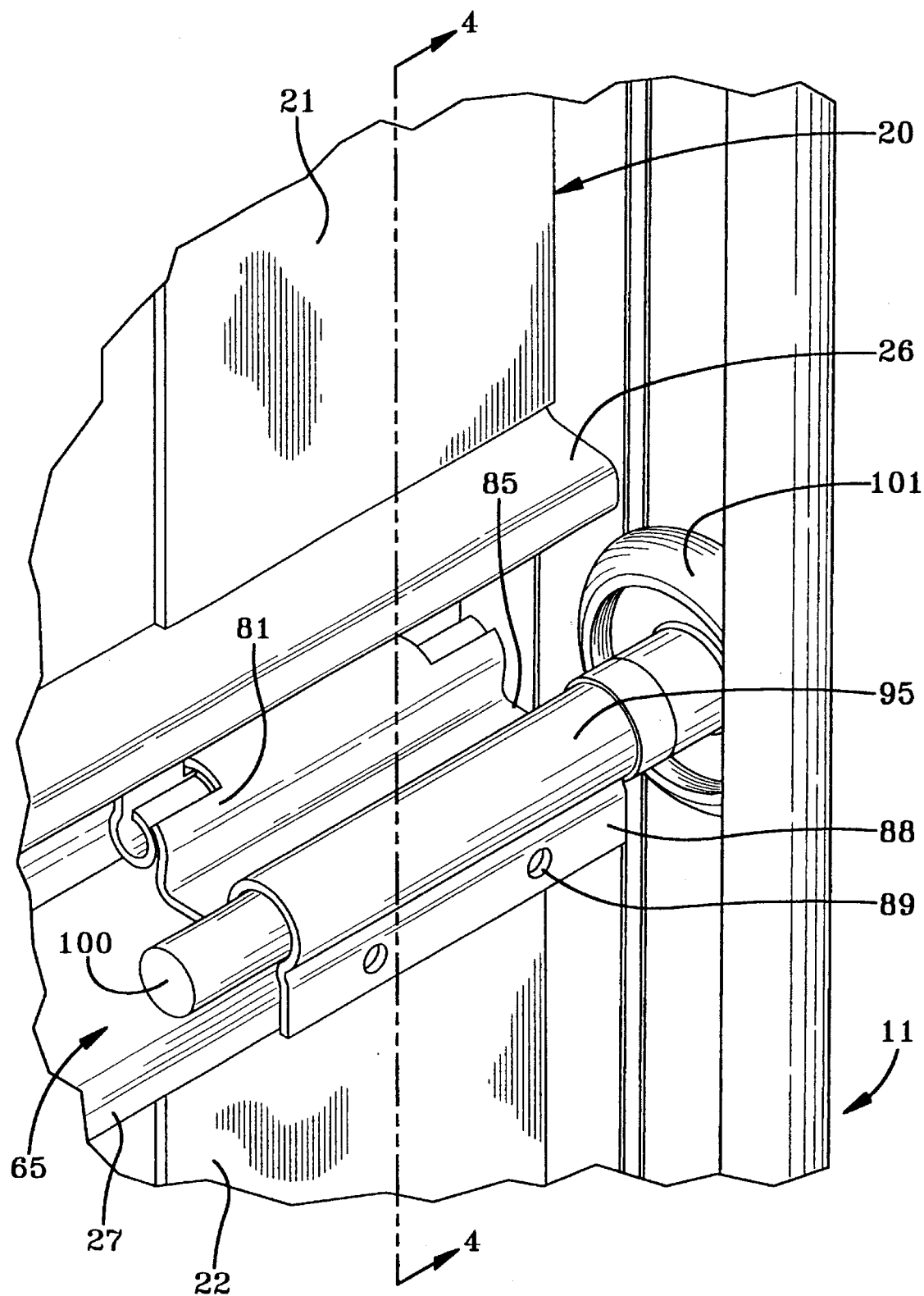
FIG. 2 is an enlarged perspective view depicting details of one of the hinges positioned to the right-hand side of the door of FIG. 1 and showing the interrelationship with the door panels which are interconnected by the hinge.
Figure 4:
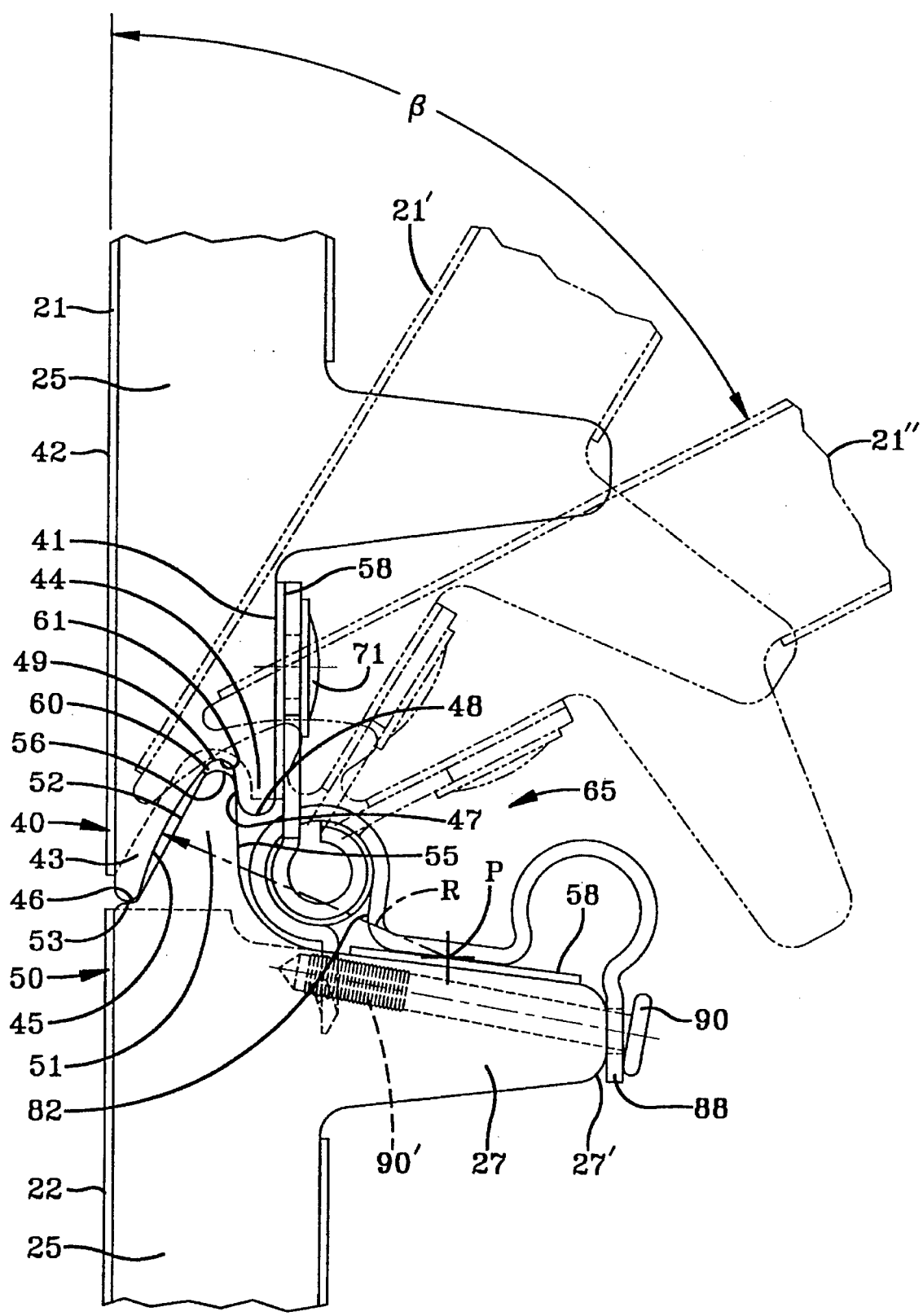
FIG. 4 is an enlarged fragmentary sectional view taken substantially along the line 4—4 of FIG. 2 of the hinge of the present invention shown in relation to the strut areas of the adjacent panels to which the hinges are mounted, with the door panels depicted in the vertical, planar position and shown at a position of maximum and intermediate deflection in chain lines.

Referring now to FIGS. 1, 2, and 4, it is to be noted that the panels 21 and 22, which are depicted for exemplary purposes, each have a body portion 25, which may be made of any of a wide variety of materials employed for sectional overhead doors. The body portions 25 may be all or partially of wood or may be of metallic or non-metallic sheet materials over a rigid foam or other laminate combinations. As shown, the panel 21 has an integrally formed, generally trapezoidal bottom rib or strut 26, and panel 22 has a similarly configured top rib or strut 27. The struts 26 and 27 serve as reinforcing members for effecting increased peripheral rigidity and beam strength and to assist in interconnecting the panels 21 and 22 in the instances of strut 27. Below the bottom strut 26 of panel 21, there is a bottom edge profile, generally indicated by the numeral 40. The bottom edge profile 40 extends the entire longitudinal length of the panel 21. Just below the bottom strut 26, the bottom edge profile 40 has an inner edge surface 41 and an outer edge surface 42 which are spaced a distance that may be substantially the same as the thickness of body portion 25 of panel 21.

The bottom edge profile 40 terminates in a pair of extending members in the form of outer finger 43 and inner finger 44. The outer finger 43 has the outer surface thereof defined by the outer edge surface 42. The inner surface of the outer finger 43 is a concave curvilinear surface 45 which may be circular and have the center of the arc or radius R defining surface 45 positioned at a point P, which lies a substantial distance inwardly of the body portion 25 of panels 21, 22. The outer finger 43 has a rounded extremity 46 which connects the outer edge surface 42 and the curvilinear surface 45.

The inner finger 44 may have as its inner surface the inner edge surface 41. The outer surface of finger 44 may be a substantially linear return surface 47. Inner finger 44 may also be provided with a rounded extremity 48 which joins the inner edge surface 41 and the return surface 47. The outer finger 43 and inner finger 44 have the concave surface 45 and the return surface 47 joined by a generally U-shaped receiver 49 constituting the inner boundary of the recess between fingers 43 and 44.

As depicted in FIG. 4, panel 22 has a top edge profile, generally indicated by the numeral 50, which is adapted to operatively pivotally interfit with the bottom edge profile 40. The top edge profile 50 includes an elongate projection 51, which is generally triangular in vertical cross-section. The projection 51 preferably has an outer planar surface 52, or, if desired, surface 52 may be slightly curved, such that it is somewhat convex. Outer planar surface 52 may advantageously be directed angularly inwardly and upwardly of body portion 25 of panel 22, such as to approximately constitute a chord of a circle centered on point P and passing through the extremities of surface 52. The outer planar surface 52 may be joined to outer surface 42 of body portion 25 by a short inset surface 53 which accommodates the rounded extremity 46 of outer finger 43 of bottom edge profile 40 in spaced relation when the door 20 is in the closed position depicted in FIG. 4 of the drawings.

The projection 51 is bounded interiorly of door 20 by an inner planar surface 55 which, as shown in FIG. 4, is directed substantially directly outwardly of top edge profile 50 of panel 22. Outer planar surface 52 and inner planar surface 55 of projection 51 are joined by a rounded extremity 56. The rounded extremity 56 moves into and out of proximity to the U-shaped receiver 49 of the bottom edge profile 40 during articulation of the panels 21 and 22. It is to be noted that the entirety of the outer planar surface 52 and the rounded extremity 56 of projection 51 lie in close proximity to curvilinear surface 45, rounded extremity 48, and return surface 47 of bottom edge profile 40 when the door 20 is in the closed position depicted in FIG. 4 of the drawings. Interiorly of the elongate projection 51 of top edge profile 50 is a hinge seating area 58, which is for a purpose described hereinafter. The hinge seating area 58 is a curving area continuing inner planar surface 55 and merging into the strut 27.

Interposed between the elongate projection 51 and the U-shaped receiver 49 is a sealing member 60. The sealing member 60 may be constructed of any of a variety of foam or other materials employed for weather sealing purposes. As shown, the sealing member 60 is an elongate strip which may have a somewhat semicircular side 61 to assist in its placement and retention in the U-shaped receiver 49 of bottom edge profile 40. The sealing member 60, when compressed by the elongate projection 51 and particularly the rounded extremity 56 thereof, serves to preclude the undesirable infiltration of water and air between the bottom edge profile 40 and the top edge profile 50.

The panels 21 and 22 are spaced and joined by a plurality of hinge assemblies, generally indicated by the numeral 65, as seen in FIGS. 1, 2, 4, 5, and 6. As best seen in FIG. 1, hinge assemblies 65 are located at the longitudinal extremity of the door panels 21, 22 for interaction with the track assemblies 11, 12, as hereinafter described. In addition, one or more similar hinge assemblies 65 may be intermittently positioned therebetween, depending upon the width of the door 20, the materials from which the door 20 is constructed, and related design considerations.

Figure 5:
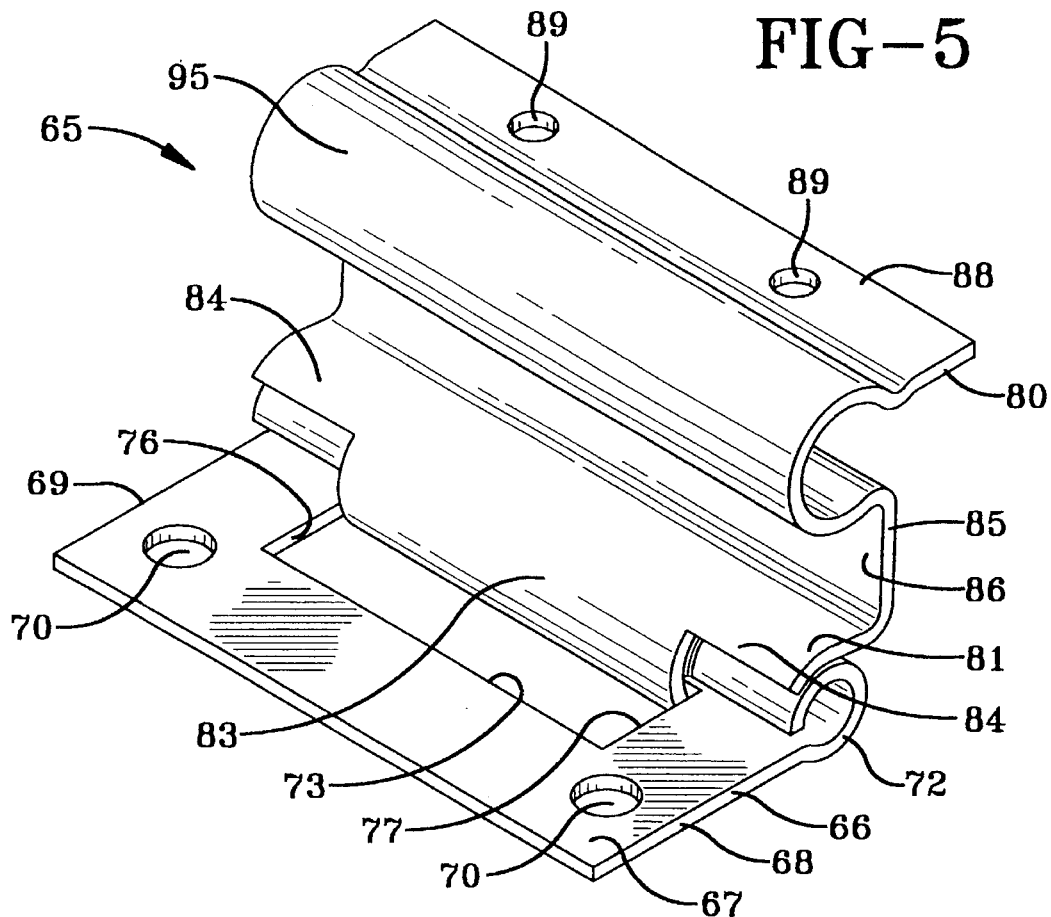
FIG. 5 is a perspective view depicting the structure of and the relationship between the two elements of the hinge.
Figure 6:
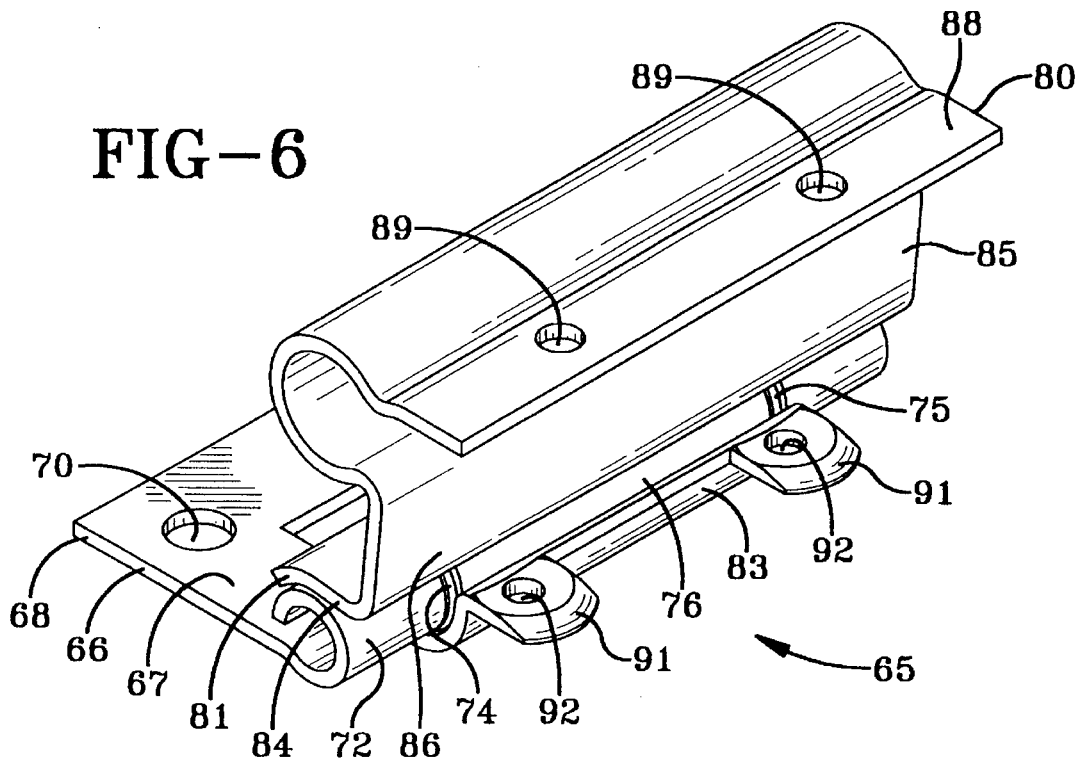
FIG. 6 is a reverse perspective view of the hinge elements of FIG. 5 showing other structural aspects of the hinges and particularly the interrelationship of the knuckle elements thereof.

The hinge assemblies 65 each have a first hinge element 66 which is associated with bottom edge profile 40. The first hinge element 66 has a first leaf 67, which is a generally rectangular member having longitudinal ends 68 and 69. The first leaf 67 has a plurality of spaced attachment apertures 70. As shown in FIGS. 5 and 6, there are two apertures 70, with one aperture 70 being located proximate each of the ends 68, 69. The apertures 70 are adapted to receive fasteners 71 (see FIG. 4), which position and attach first hinge elements 66 to a bottom edge profile 40 and particularly inner edge surface 41 underlying the bottom strut 26. The fasteners 71 may be screws, bolts, rivets, or other elements, depending upon the material of the top panel 21, as is well known to persons skilled in the art.

The first leaf 67 of first hinge element 66 has at one longitudinal edge a first cylindrical knuckle 72. The first cylindrical knuckle 72 preferably extends the entire length of the first leaf 67 from end 68 to end 69. The first leaf 67 has a through slot 73 positioned proximate to the first cylindrical knuckle 72. As shown, the through slot 73 is generally rectangular and is spaced a distance from each of the ends 68 and 69 of the first leaf 67. The first cylindrical knuckle 72 advantageously is provided with a pair of raised cylindrical strips 74 and 75, which serve as bearing surfaces in a manner described hereinafter. The raised cylindrical strips 74 and 75 are preferably positioned longitudinally of the first cylindrical knuckle 72, such as to be spaced at a substantial distance but inwardly of the ends 76 and 77 of the through slot 73.

The hinge assemblies 65 also include a second hinge element 80 which is affixed to the upper middle panel 22 and interengages with the first hinge element 66 to provide the requisite pivotal connection. The second hinge element 80 has a second cylindrical knuckle 81 which is preferably of substantially the same axial extent as first cylindrical knuckle 72. The second cylindrical knuckle 81 has an inner diameter 82 which is slightly greater than the outer diameter 76 of the first cylindrical knuckle 72. In this manner, the second cylindrical knuckle 81 is configured to rotate about the outer diameter 76 of first cylindrical knuckle 72 to form interlocking hinge elements which do not require a hinge pin. The previously described raised cylindrical strips 74 and 75 are adapted to engage and serve as spaced bearing surfaces for the inner diameter 82 of the second cylindrical knuckle 81. The second cylindrical knuckle 81 has a tongue 83 over a portion of its circumferential extent. The tongue 83 is of a longitudinal extent slightly less than the longitudinal extent of the through slot 73 in first leaf 67, such that the tongue 83 extends into the through slot 73 and overlies a portion of the first cylindrical knuckle 72 of the first hinge element 66. The second cylindrical knuckle 81 forms lateral support members 84 in the remainder of the second cylindrical knuckle 81 which is not occupied by the tongue 83. As shown, the support members 84 extend longitudinally outwardly of the tongue 83 and, as shown, preferably extend substantially to the same longitudinal dimension as the longitudinal extent of first cylindrical knuckle 72. The second cylindrical knuckle 81 adjacent the support members 84 in the direction opposite the tongue 83 merges into a second leaf 85 consisting of a generally rectangular surface 86, which is preferably of substantially the same longitudinal extent as second cylindrical knuckle 81. The surface 86 of second leaf 85 is adapted to seat against the top strut 27 proximate the top edge profile 50. The second cylindrical knuckle 81 of the second hinge element 80 reposes in the hinge seating area 58 of the top edge profile 50.

The second hinge element 80 is attached to the upper middle panel 22 to effect the articulation necessary between the panels 21 and 22. In particular, the second leaf 85 has a flange 88 which is disposed at an angle, such as to overlie the inner extremity 27' of top strut 27 of upper middle panel 22 (see FIG. 4). The flange 88 has a pair of bores 89 for receiving fasteners 90. The fasteners 90 extend into the top strut 27 and engage a pair of projecting tabs 91 which extend angularly from the extremity of the tongue 83 of the second cylindrical knuckle 81. The tabs 91 may be provided with bores 92 for receiving the fasteners 90 which may have a threaded portion 90' for engagement therewith.

It will thus be appreciated that the fasteners 90, which may be screws, bolts, rivets, or other specialty connecting devices, extend through the inner extremity 27' and parallels a side of the top strut 27 to provide a firm, spaced interconnection with flange 88 and tabs 91 of the second hinge element 80.

The planar surface 86 of the second leaf 85 of second hinge element 80 are discontinuous to accommodate the formation of a cylindrical sleeve 95. As best seen in FIG. 2, the cylindrical sleeve 95 supports a shaft 100. In conventional fashion, shaft 100 mounts a roller 101 which interengages track assembly 11 as seen in FIG. 2. The cylindrical sleeve 95 may be variously positioned laterally of the second leaf 85 (FIG. 4), depending upon the standoff distance required for a particular hinge assembly 65 due to its positioning on the sectional door 20. In particular, the standoff distance between a particular roller 101 and the adjacent floor panels must provide for closure of the sectional door 20 against the door frame F when the sectional door 20 is in the closed, vertical position. The standoff distance variation is, of course, occasioned by the angular inclination of the vertical track sections 13 relative to the door frame F. Thus, a substantial standoff distance is noted in positioning of the cylindrical sleeve 95 where a hinge assembly 65 is designed for the juncture between panels 21 and 22. Progressively lesser standoff distances are necessarily required between the panels 22 and 23 and panels 23 and 24.

The hinge assembly 65 depicted in FIGS. 5 and 6 is exemplary of a standoff distance positioning as might exist between the panels 22 and 23 wherein the cylindrical sleeve 95 is positioned in closer proximity to the second cylindrical knuckle 81 than that depicted in FIGS. 2 and 4. It will be appreciated that all hinges assemblies 65 for a sectional door 20 may be identical except for the positioning of the cylindrical sleeve 95 laterally of second leaf 85, depending upon the positioning as between door panels and the particular characteristics of the door panels, the door frame F, and the track assemblies 11, 12.

Referring now to FIGS. 3 and 4, it will be appreciated that the panel edge profiles 40, 50, together with the hinge assemblies 65, provide for angular displacement between adjacent panels 21 and 22 when moving from vertical track sections 13 to horizontal track sections 15 through transition track sections 14 through a maximum angle β of approximately 70 degrees from the 0 degree angle existing when adjacent panels are in planar alignment. The position of essentially maximum angularity where the angle β is at its maximum 70 degrees is depicted in FIG. 3 of the drawings.

The planar aligned position of adjacent panels 21 and 22 where the angle β is equal to 0 is depicted in solid lines in FIG. 4, with top panel 21 positioned co-planar with upper middle panel 22. During articulation of the panels, the top panel 21 moves through an intermediate position depicted in chain lines as 21' to a position of maximum angularity, with the angle β being equal to approximately 70 degrees as depicted in chain lines at 21".

It is significant to note that the configuration of the panel edge profiles 40, 50 and hinge assemblies 65, together with their placement and operating interrelationship, serve to provide the anti-pinch feature of the instant system. As may be particularly no;ted from FIG. 4, the rounded extremity 46 of outer finger 43 of the bottom edge profile 40 remains in close proximity through the full extent of angular movement between panels 21 and 22, with the top edge profile 50 and particularly either the outer planar surface 52 or rounded extremity 56 of the elongate projection 51. In a dimensional sense, this proximity may be readily controlled to at all times remain within a distance of approximately 0.2 inch, such that a person's fingers cannot be inserted between the bottom edge profile 40 and the top edge profile 50 at any time during operational movement of sectional door 20.

Figure 7A:
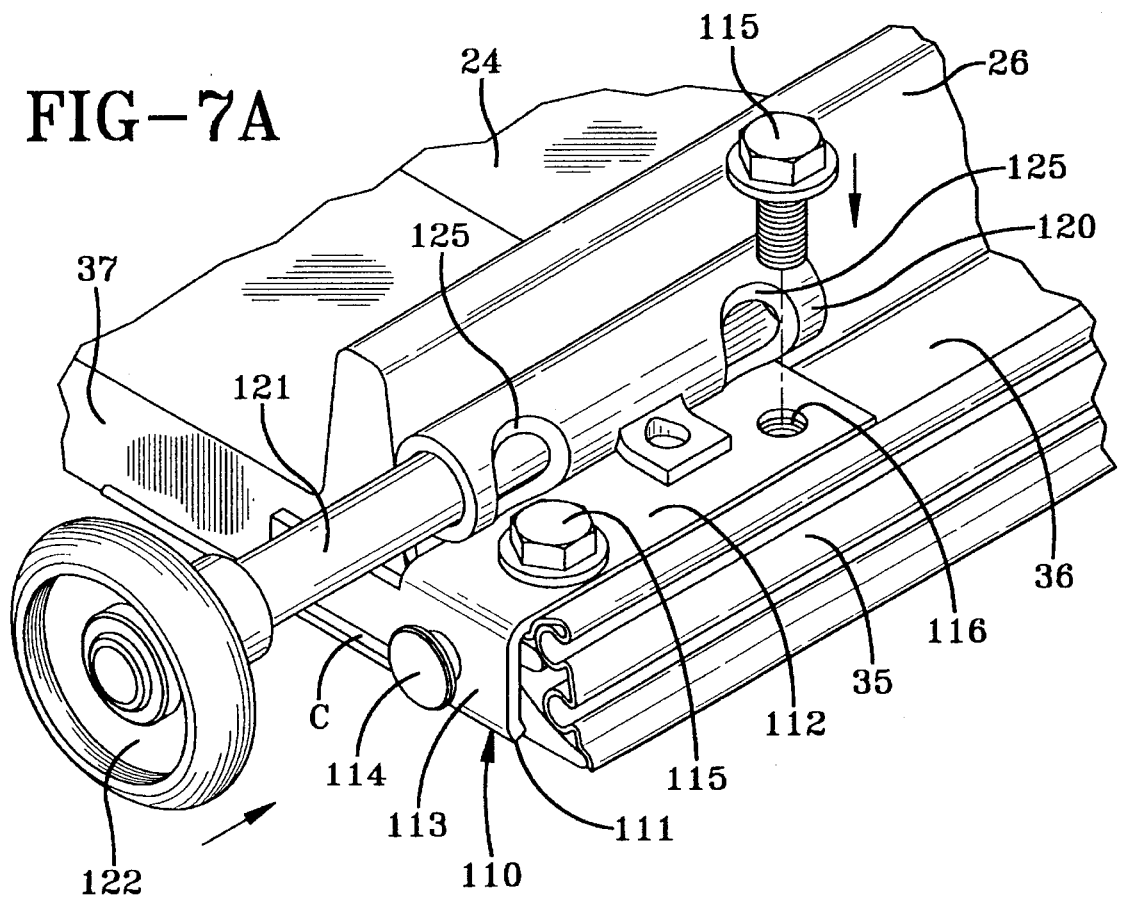
FIG. 7A is a perspective view depicting a bottom bracket according to the concepts of the present invention shown in the process of installation at the lower corner of the bottom panel of the door with the roller shaft partially inserted to permit installation of one of the fasteners through a cutout in the roller shaft sleeve.
Figure 7B:
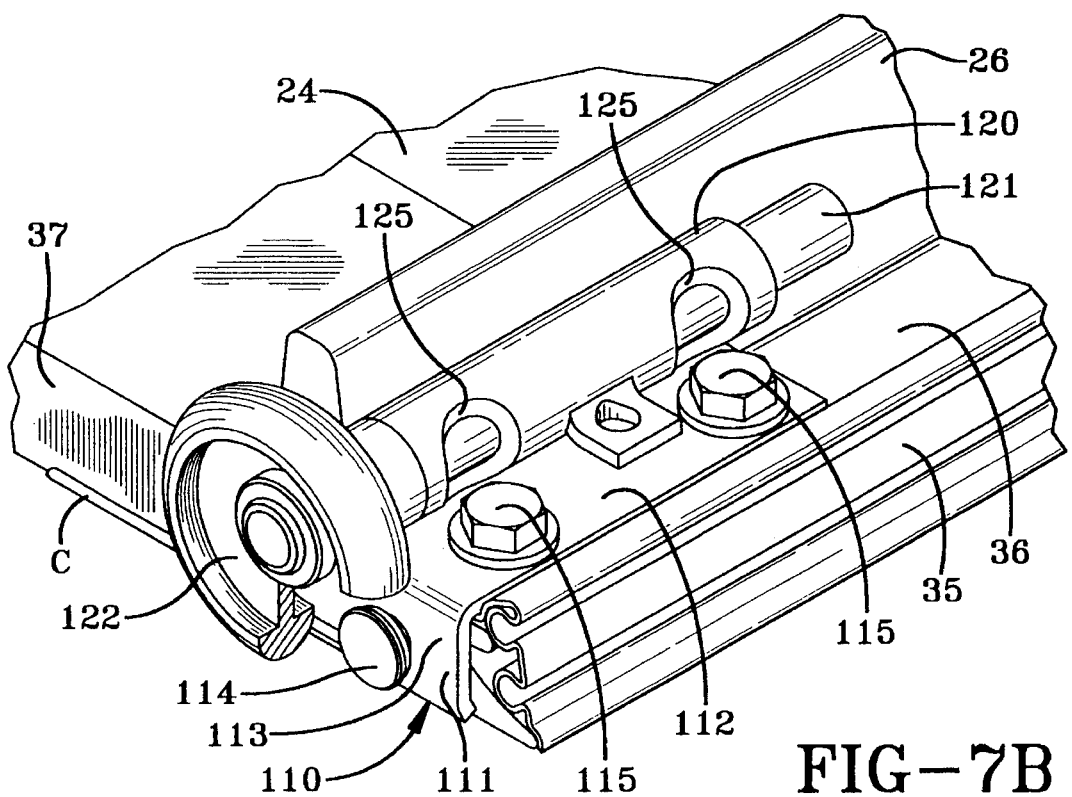
FIG. 7B is a view similar to FIG. 7A showing the bottom bracket fully installed with the roller shaft operatively positioned in the sleeve, thereby precluding removal of the fasteners.

Referring now to FIGS. 1 and 7 of the drawings, the lower corners of the bottom panel 24 of the sectional door 20 each carry a bracket and roller assembly, generally indicated by the numeral 110. For exemplary purposes, the bracket and roller assembly 110 at the lower left-hand corner of the sectional door 20 depicted in FIG. 1 is shown in detail in FIG. 7A. The bracket and roller assembly 110 includes an L-shaped plate 111 which is located near the bottom edge 35 of the sectional door 20. It will be appreciated by persons skilled in the art that the bottom edge 35 may have any of a variety of astragal configurations attached to it for purposes of effecting sealing and meeting other operational requirements.

The bottom panel 24 may also have an inner surface 36 and a side edge 37. The L-shaped plate 111 has a first leg 112 which overlies the inner surface 36 of the sectional door 20. A second leg 113 of L-shaped plate 111 overlies the side edge 37 of sectional door 20. As shown, the second leg 113 carries a projecting knob 114 which is adapted to anchor or otherwise secure the extremity of a cable C. The cable C interconnects with the counterbalance system (not shown) for the sectional door 20. In particular, the cable C is normally reeved about a pulley (not shown) at the upper corner of the door frame F and is operatively interrelated with tension members, such as to provide increasing counterbalancing forces to the sectional door 20 through the bottom panel 24 as the sectional door 20 is lowered to the closed, vertical position depicted in FIG. 1.

As shown, the first leg 112 of the L-shaped plate 111 may be positioned below bottom strut 26 of the bottom panel 24 in order that all of the panels 21, 22, 23, and 24 may be of the same structural configuration, if desired. The L-shaped plate 111 is attached to the panel inner surface 36 by a pair of fasteners 115 that pass through bores 116, which may be threaded strategically positioned in the first leg 112 and extending into the bottom panel 24. The fasteners 115 may be screws, bolts, or other appropriate connecting members, depending upon the material from which a particular sectional door 20 is constructed. Formed integrally with or attached, as by welds (not shown), to the L-shaped plate 111 is a cylindrical sleeve 120, which is adapted to receive a conventional shaft 121 mounting a roller 122 for engagement with track assembly 12. The cylindrical sleeve 120 has a pair of cutouts 125 which penetrate the entire thickness of the cylindrical sleeve 120, such that at least a portion of the shaft 121 extends therethrough.

The bores 116 and the sleeve 120 are juxtapositioned on the first leg 112 of L-shaped plate 111 according to a particular relationship. Specifically, the fasteners 115 may be removed by passing through the cutouts 125 in the sleeve 120 when the shaft 121 is not positioned in the sleeve 120. However, when the shaft 121 carrying roller 122 is positioned in sleeve 120, removal of the fasteners 115 is not possible due to interference with the portions of shaft 121 located in the cutouts 125. This arrangement permits installation of the bracket and roller assembly 110 in positions of the sectional door 20 where the cable C is not under tension; however, it precludes the possibility for removal of the fasteners 115 in the closed, vertical position of the sectional door 20 or other locations where the cable C is tensioned because the roller 122 and attached shaft 121 cannot be removed from the sleeve 120 in those locations. It will be observed that, as shown, the cutouts 125 are in effect a cylindrical notch segment in the sleeve 120, based upon a cut made perpendicular to the first leg 112 of L-shaped plate 111, with the notch having a diameter slightly greater than the heads of fasteners 115 and positioned substantially concentric therewith.

Additional details of a preferred structure for the panels 21, 22, 23, and 24 are shown in FIGS. 8 and 9A of the drawings. Inasmuch as the hinge assemblies 65 and other hardware are adapted to fit the basic door panel configuration shown herein, all door panels may be identical, such that door panel 22 is hereinafter described for exemplary purposes.

The panel 22 has a foam core 140 which is of a generally rectangular configuration, except for variations that are noted hereinafter. The foam core 140 is preferably a low-density, rigid foam of any of a wide variety of compositions well known in the industry. The foam core 140 is constructed of an appropriate synthetic resin, such as polyurethane foam, for purposes of achieving both strength and insulating characteristics. The foam core 140 may be in the nature of a precut, foamed insert or may be foamed in place according to techniques known in the art. The panel 22 has a front surface, generally indicated by the numeral 141, which is defined by an outer skin 142. The outer skin 142 is preferably constructed of a light-gauge, high-strength steel, which may be processed in a manner to resist exposure to the elements in a manner known to persons skilled in the art.

The outer skin 142 preferably extends the full longitudinal and lateral extent of front surface 141 of panel 22. In addition, the skin 142 preferably extends about and defines the outer surfaces of top edge profile 50 and bottom edge profile 40. The skin 142 also preferably continues to define the generally trapezoidal bottom rib or strut 26 and the top rib or strut 27 of panel 22. The skin 142 preferably terminates laterally inwardly of each of the struts 26, 27 in spaced flanges 143 and 144. The top and bottom edge profiles 40, 50 and struts 26, 27 are preferably interiorly filled by the foam core 140.

The door panel 22 has as a portion of an inner surface, generally indicated by the numeral 145, an inner skin 146, which extends between flanges 143, 144 the longitudinal length of panel 22. The skin 146 preferably has lateral extremities 147 and 148 which advantageously overlap and, as shown, underlie the flanges 143 and 144, respectively. The inner skin 146 may be made of treated paper, metallic-coated paper, non-metallic sheet material, or metallic sheet of types which are known in the art.

The inner surface 145 has a medial recess, generally indicated by the numeral 150, which is preferably centered laterally, substantially medially of panel 22 in the inner skin 146 and the foam core 140. As shown in FIG. 9A, the recess 150 extends approximately one-half of the distance from the center of panel 22 to each edge profile 40, 50. The inner surface 145 has offsets 151 and 152 which transcend from full-thickness sections 140' to a reduced-thickness section 140" of foam core 140. It has been determined that reduced-thickness section 140" can be as thin as approximately 0.25" while maintaining the desired stiffness, sound-deadening, and insulating properties of the door panel 22 as a whole in an air environment. It will, of course, be appreciated that the offsets 151 and 152 contribute to increasing the rigidity of the panel 22. It will further be appreciated by persons skilled in the art that full-thickness sections 140' and reduced-thickness section 140" of foam core 140 may be varied in thickness as required to meet insulation, sound-deadening, or stiffness requirements for a particular door design. As seen in FIG. 9A, the offsets 151, 152 may be relatively steeply inclined in that they are positioned at an angle of approximately 60 degrees to a line perpendicular to the reduced-thickness surface 153 of recess 150. With the structural arrangement shown in FIG. 9A, the quantity of foam for the foam core 140 can be reduced on the order of 30 to 40 percent of that required for a conventional rectangular foam core without significantly adversely affecting the characteristics of the panel 22 as noted hereinabove.

As seen in FIG. 8, the panel 22 may be provided with end caps 155 which overlie the ends of foam core 140 and the longitudinal extremities of outer skin 142 and inner skin 146. If desired, spaced stiles or muttons may be provided at one or more positions longitudinally of the door panel 22.

A modified door panel 222 is depicted in FIG. 9B of the drawings. The panel 222 is configured the same as the panel 22 of FIG. 9A, except for medial recess, generally indicated by the numeral 250, in the inner surface 245. As shown, the recess 250 extends approximately one-half of the distance from the center of panel 22 to each of the edge profiles in a manner comparable to recess 150. The inner surface 245 has offsets 251 and 252 which transcend from full-thickness sections 240' to a reduced-thickness section 240" of foam core 240. In a manner similar to the panel 22, it has been determined that reduced-thickness section 240" can be as thin as approximately 0.25" while maintaining the desired stiffness, sound-deadening, and insulating properties of the door panel 222 as a whole in an air environment. It will be appreciated that the offsets 251 and 252 contribute, to some measure, to increasing the rigidity of the panel 222, although less steeply inclined than the offsets 151, 152. The possibilities of varying the thickness of full-thickness sections 240' and reduced-thickness section 240" of foam core 240 are, of course, available to satisfy requirements for a particular door design. The panel 222 can produce a foam quantity reduction on the order of 30 to 40 percent without significantly adversely affecting the stiffness, sound-deadening, and insulating properties of the panel 222.

Another modified door panel 322 is depicted in FIG. 9C of the drawings. The panel 322 is configured the same as the panels 22 and 222 of FIGS. 9A and 9B, except for medial recess, generally indicated by the numeral 350, in the inner surface 345. In this instance, the recess 350 is in the form of a gradual curve, which extends substantially the entire width of the inner surface 345 to create a concave configuration. Here, the foam core 340 has a minimum-thickness portion 340" substantially medially of the transverse width of inner surface 345 with tapering, progressively thicker sections 340' to either side thereof. The possibilities of varying the thickness dimensions of foam core 340 and achieving a foam quantity reduction, as discussed in relation to panel 22 and 222 are, are equally applicable.

From the discussion involving panels 22, 222, and 322, it will be appreciated that innumerable geometric configurations by way of combinations of curved and linear surfaces could be employed to achieve foam reduction without substantially compromising specifications by the incorporation of a recess or recesses in the inner surface of a door panel.

Thus, it should be evident that the sectional overhead door disclosed herein carries out various of the objects of the present invention set forth above and otherwise constitutes an advantageous contribution to the art. As will be apparent to persons skilled in the art, modifications can be made to the preferred embodiments disclosed herein without departing from the spirit of the invention, the scope of the invention being limited solely by the scope of the attached claims.

We claim:

1. A pivotal connector in combination with a sectional door comprising, at least two adjacent panels, a first hinge element having a first leaf overlying a portion of one of said adjacent panels, spaced apertures in said first leaf for receiving fasteners to attach said first leaf to said one of said adjacent panels, a generally cylindrical first knuckle at one edge of said first leaf, a through slot in said first leaf proximate to said first knuckle, a second hinge element having a second leaf overlying the other of said adjacent panels, spaced bores in said second leaf for receiving fasteners to attach said second hinge element to said other of said adjacent panels, and a generally cylindrical second knuckle at one edge of said second hinge element extending into said through slot and rotatable about said first knuckle for controlled relative pivotal motion between said first hinge element and said second hinge element, said first knuckle having raised circumferential strips for engaging said second knuckle as bearing surfaces.

2. A pivotal connector for a sectional door according to claim 1, wherein said first leaf has longitudinal ends with said through slot paralleling said first knuckle and terminating a distance inwardly of said longitudinal ends of said first leaf.

3. A pivotal connector for a sectional door according to claim 2, wherein said first knuckle extends substantially the entire distance between said longitudinal ends of said first leaf.

4. A pivotal connector for a sectional door according to claim 3, wherein said second knuckle has a projecting tongue extending into said through slot and engaging said circumferential strips.

5. A pivotal connector in combination with a sectional door comprising, at least two adjacent panels, a first hinge element having a first leaf overlying and attached to one of said panels, said first leaf having longitudinal ends, a generally cylindrical first knuckle at one edge of said first leaf extending substantially the entire distance between said longitudinal ends, a through slot in said first leaf proximate to said first knuckle paralleling said first knuckle and terminating a distance inwardly of said longitudinal ends of said first leaf, a second hinge element having a second leaf overlying the other of said adjacent panels, first bores in said second leaf for receiving fasteners, and a generally cylindrical second knuckle at one edge of said second hinge element having a tongue extending into said through slot and rotatable about said first knuckle for controlled relative pivotal motion between said first hinge element and said second hinge element, said projecting tongue having extending tabs with second bores therein for receiving said fasteners to attach said second hinge element to said other of said adjacent panels.

6. A pivotal connector for a sectional door according to claim 5, wherein said second leaf has at least a portion of a cylindrical sleeve for mounting a shaft for a roller therein.

7. A pivotal connector for a sectional door according to claim 5, wherein said adjacent panels have reinforcing struts extending the longitudinal length thereof and positioned proximate to said first hinge element and said second hinge element.

8. A pivotal connector for a sectional door according to claim 7, wherein said second leaf of said second hinge element seats against and is attached to one of said reinforcing struts.

9. A pivotal connector in combination with a sectional door comprising, at least two adjacent panels, a first hinge element having a first leaf overlying and attached to one of said panels, said first leaf having longitudinal ends, a generally cylindrical first knuckle at one edge of said first leaf extending substantially the entire distance between said longitudinal ends, a through slot in said first leaf proximate to said first knuckle paralleling said first knuckle and terminating a distance inwardly of said longitudinal ends of said first leaf, a second hinge element having a second leaf overlying and attached to the other of said adjacent panels, and a generally cylindrical second knuckle at one edge of said second hinge element having support members extending substantially the length of said first knuckle and having a tongue projecting from said support members and extending into said through slot and rotatable about said first knuckle for controlled relative pivotal motion between said first hinge element and said second hinge element.

10. A pivotal connector for a sectional door according to claim 9, wherein said first knuckle has circumferential bearing strips rising from the outside surface thereof and engaging the inside surface of said projecting tongue.

* * * * *